United States Patent
McMillan et al.

(10) Patent No.: US 7,531,938 B2
(45) Date of Patent: May 12, 2009

(54) INSERTABLE BRUSH HOLDER ASSEMBLY FOR ELECTRIC MOTOR

(75) Inventors: Douglas deHaas McMillan, St. Paul, MN (US); David Lawrence Dahlen, Spring Valley, WI (US)

(73) Assignee: McMillan Electric Company, Woodville, WI (US)

( * ) Notice: Subject to any disclaimer, the term of this patent is extended or adjusted under 35 U.S.C. 154(b) by 394 days.

(21) Appl. No.: 11/276,737

(22) Filed: Mar. 13, 2006

(65) Prior Publication Data
US 2007/0210671 A1 Sep. 13, 2007

(51) Int. Cl.
*H02K 13/00* (2006.01)
(52) U.S. Cl. .......................................... 310/239; 310/89
(58) Field of Classification Search .................. 310/89, 310/71, 239–247
See application file for complete search history.

(56) References Cited

U.S. PATENT DOCUMENTS

| | | | | |
|---|---|---|---|---|
| 2,637,826 | A | * | 5/1953 | Humphrey .................. 310/247 |
| 3,431,445 | A | | 3/1969 | Petersen |
| 3,436,576 | A | | 4/1969 | Klebe |
| 3,510,708 | A | | 5/1970 | O'Connor |
| 3,513,343 | A | | 5/1970 | Harvey |
| 3,710,159 | A | | 1/1973 | Dupuis |
| 3,898,493 | A | | 8/1975 | Schaffer |
| 4,095,131 | A | * | 6/1978 | Febonio ....................... 310/239 |
| 4,335,323 | A | * | 6/1982 | Kebbon et al. ............ 310/40 R |
| 4,375,040 | A | | 2/1983 | Sauerwein |
| 4,389,588 | A | | 6/1983 | Rankin |
| 4,593,221 | A | * | 6/1986 | Harris et al. ................. 310/242 |
| 4,677,333 | A | | 6/1987 | Auzolat |
| 4,728,835 | A | | 3/1988 | Baines |
| 4,855,631 | A | | 8/1989 | Sato |
| 4,959,576 | A | * | 9/1990 | Horibe et al. ................ 310/239 |
| 5,148,073 | A | * | 9/1992 | Tamura ....................... 310/239 |
| 5,184,041 | A | * | 2/1993 | Baer et al. ................... 310/239 |
| 5,644,182 | A | | 7/1997 | Rawls |
| 5,717,272 | A | | 2/1998 | Gobled |
| 5,878,480 | A | * | 3/1999 | Rawls .......................... 29/597 |
| 6,965,178 | B2 | * | 11/2005 | Takahashi et al. .......... 310/68 R |

(Continued)

OTHER PUBLICATIONS

Phoenix Electric Mfg. Co., Phoenix® The Brush Holder Experts®, *The Phoenix Constant Force Cartridge Brush Holder*®, printed Sep. 24, 2008, 2 pages.

(Continued)

*Primary Examiner*—Thanh Lam
(74) *Attorney, Agent, or Firm*—Merchant & Gould P.C.

(57) ABSTRACT

A brush holder assembly for an electrical motor includes a brush box including a main body and a cover portion, the main body with a cavity and including a set of first arms extending in opposition from the main body. The cover portion includes a set of second arms extending in opposition from the cover portion, and a set of projections extending in opposition to one another from the cover portion. Each of the set of first arms and a respective one of the set of second arms define a channel therebetween sized to receive a portion of a sleeve of the electric motor. The assembly also includes a cover that is coupled to the cover portion of the brush box, a brush located in the cavity of the brush box, and a spring positioned against the brush to force the brush towards a commutator of the electric motor.

13 Claims, 12 Drawing Sheets

U.S. PATENT DOCUMENTS

| | | |
|---|---|---|
| 7,402,933 B1 | 7/2008 | Bank |
| 2004/0263022 A1 | 12/2004 | Yu |
| 2005/0156477 A1 | 7/2005 | Bocka |

OTHER PUBLICATIONS

Phoenix Electric Mfg. Co., Phoenix® The Brush Holder Experts®, *Phoenix Electric Brush Holders,* Copyright © 1998-2008, 1 page.

Phoenix Electric Mfg. Co., Phoenix® The Brush Holder Experts®, Products, Copyright © 1998-2008, 2 pages.

Phoenix Electric Mfg. Co., Phoenix® The Brush Holder Experts®, *Constant Force Modular Integrated Internal Brush Holder®,* Copyright © 1998-2008, 1 page.

Phoenix Electric Mfg. Co., Phoenix® The Brush Holder Experts®, *The Phoenix Constant Force Modular Integrated Internal Brush Holder®,* printed Sep. 24, 2008, 2 pages.

Phoenix Electric Mfg. Co., Phoenix® The Brush Holder Experts®, *Constant Force Cartridge Brush Holder®,* Copyright © 1998-2008, 2 pages.

Depiction of Motor Design admitted as prior art. it is proper without date.

Phoenix Electric Mfg. Co., Phoenix® The Brush Holder Experts®, *The Phoenix Constant Force Cartridge Brush Holder®,* printed Sep. 24, 2008, 2 pages.

Phoenix Electric Mfg. Co., Phoenix® The Brush Holder Experts®, *Phoenix Electric Brush Holders,* Copyright © 1998 - 2008, 1 page.

Phoenix Electric Mfg. Co., Phoenix® The Bruch Holder Experts®, Products, Copyright © 1998 - 2008, 2 pages.

Phoenix Electric Mfg. Co., Phoenix® The Brush Holder Experts®, *Constant Force Modular Integrated Internal Brush Holder®,* Copyright© 1998 - 2008, 1 page.

Phoenix Electric Mfg. Co., Phoenix® The Brush Holder Experts®, *The Phoenix Constant Force Modular Integrated Internal Brush Holder®,* printed Sep. 24, 2008, 2 pages.

Phoenix Electric Mfg. Co., Phoenix® The Brush Holder Experts®, *Constant Force Cartridge Brush Holder®,* Copyright © 1998 - 2008, 2 pages.

\* cited by examiner

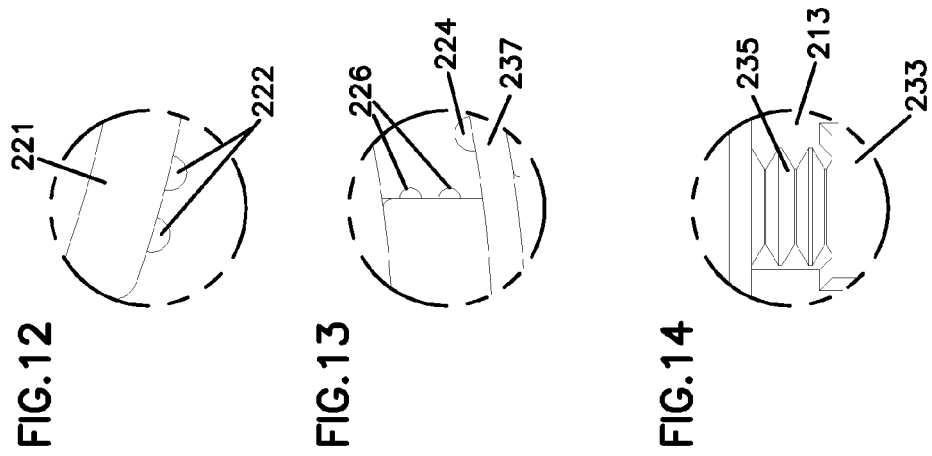
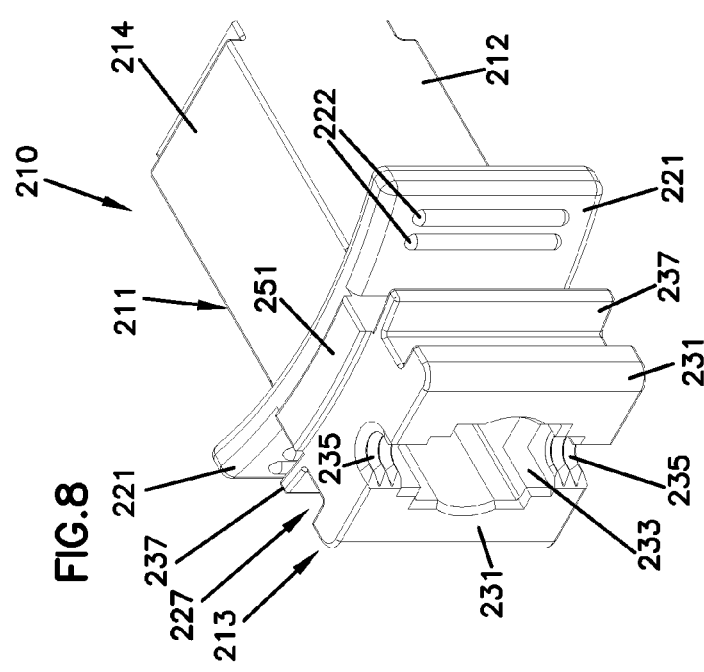

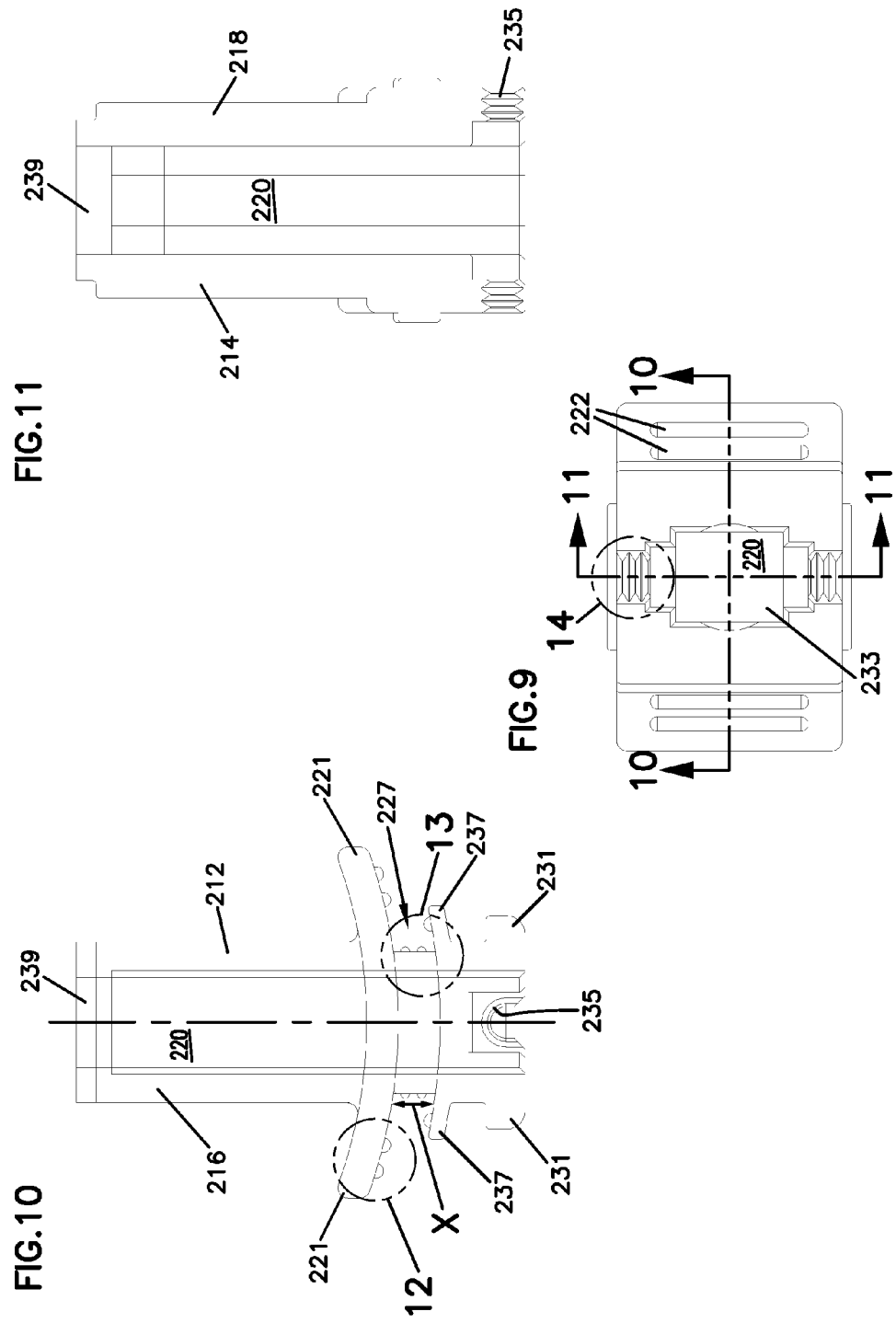

INSERTABLE BRUSH HOLDER ASSEMBLY FOR ELECTRIC MOTOR

TECHNICAL FIELD

Embodiments disclosed herein relate generally to electric motors.

BACKGROUND

Many electric motors are commutated by switching the current applied to the commutator of a motor using two or more brushes that contact the commutator. Typically, brush holder assemblies are mounted to the electric motor to hold the brushes in electrical contact with the commutator. A spring is included in each brush holder assembly to exert a force on the brush to maintain contact between the brush and the commutator.

In some motors, the brush holder assemblies are molded into the sleeve and/or endcap of the motor. In other motors, the brush holder assemblies are mounted to the electric motor. During manufacture of the electric motor, it is necessary to place a brush and spring into each brush holder assembly. It is further necessary to electrically connect each brush to a source of electrical current.

In some applications, the useful life of the brushes is exceeded before the useful life of the motor is reached. For example, the friction between the brushes and the commutator can result in wearing of the brushes over time and decreased performance. It may therefore be desirable to provide access to the brushes in the brush holder assemblies so that the brushes can be periodically replaced.

SUMMARY

Embodiments of the present invention relate generally to electric motors.

According to one aspect, a brush holder assembly for an electrical motor includes a brush box including a main body and a cover portion, the main body defining a cavity and including a set of first arms extending in opposition from the main body, and the cover portion defining an opening in communication with the cavity and including a set of second arms extending in opposition from the cover portion, and a set of projections extending in opposition to one another from the cover portion, wherein each of the set of first arms and a respective one of the set of second arms define a channel therebetween sized to receive a portion of a sleeve of the electric motor. The brush holder assembly also includes a cover that is coupled to the cover portion of the brush box, a brush located in the cavity of the brush box, and a spring with first and second ends, the first end being positioned against the cover, and the second end being positioned against the brush to force the brush away from the cover and towards a commutator of the electric motor.

According to another aspect, an electric motor includes a cylindrical sleeve including first and second ends, the first end defining a C-shaped notch therein, and a rotational assembly including a commutator located in the sleeve. The electric motor includes a brush box including a main body and a cover portion, the main body defining a cavity and including a set of first arms extending in opposition from the main body, the cover portion defining an opening in communication with the cavity and including a set of second arms extending in opposition from the cover portion, and each of the set of first arms and a respective one of the set of second arms define a channel therebetween sized to receive a portion of the sleeve as the brush box is slid axially into the notch formed in the sleeve. The electric motor also includes an endcap coupled to sleeve to capture the brush box in the notch of the sleeve, a brush located in the cavity of the brush box, and a spring positioned against the brush to force the brush towards the commutator of the electric motor.

According to yet another aspect, a method of assembling an electric motor includes: (a) sliding a brush box axially into a notch formed in an end of a sleeve of the electric motor; (b) coupling an endcap to the motor to capture the brush box in the notch of the sleeve; (c) placing a brush and a spring into a brush box; and (d) attaching a cover to the brush box;

DESCRIPTION OF THE DRAWINGS

FIG. 8 is a perspective view of one brush box of FIG. 7.
FIG. 9 is a top view of the brush box of FIG. 8.
FIG. 10 is a cross-sectional view of the brush box of FIG. 9 taken along line 10-10.
FIG. 11 is a cross-sectional view of the brush box of FIG. 9 taken along line 11-11.
FIG. 12 is an enlarged view of a portion of the brush box of FIG. 10.
FIG. 13 is an enlarged view of a portion of the brush box of FIG. 10.
FIG. 14 is an enlarged view of a portion of the brush box of FIG. 9.

DETAILED DESCRIPTION

Embodiments disclosed herein relate generally to electric motors. While the disclosure is not so limited, an appreciation of the various aspects of the disclosure will be gained through a discussion of the examples provided below.

Figure 1:
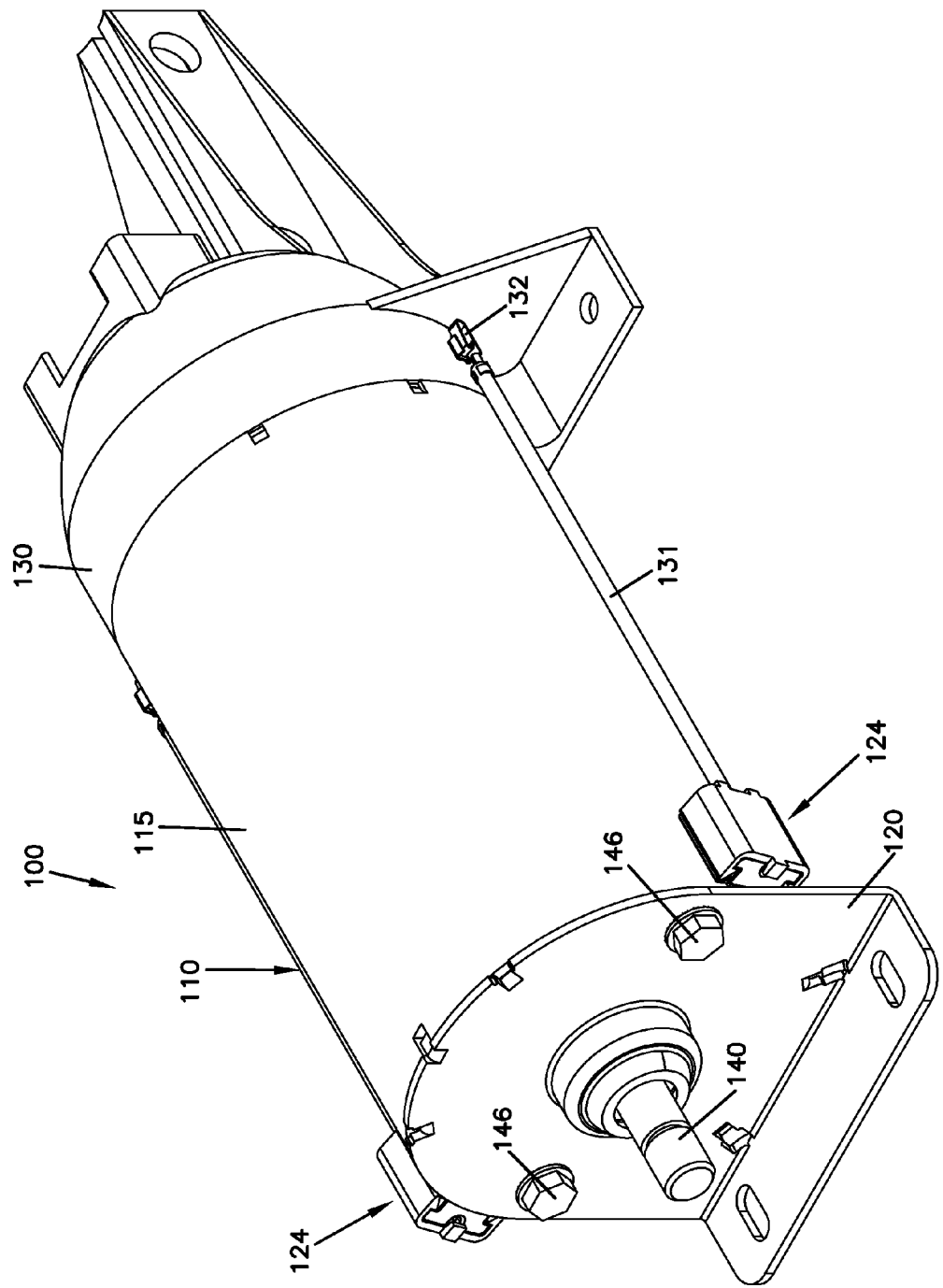
FIG. 1 is a perspective view of an example electric motor.
Figure 2:
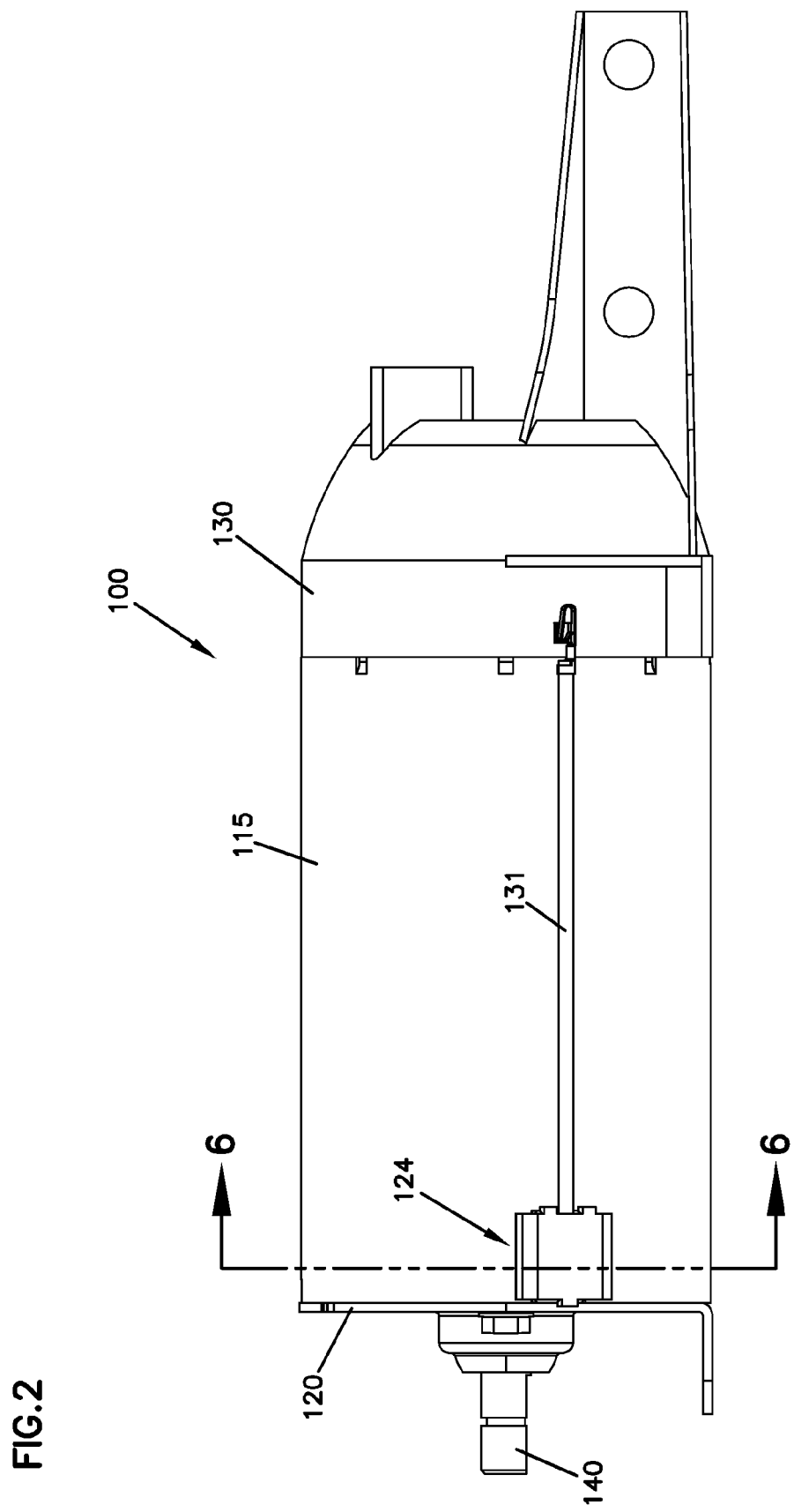
FIG. 2 is a side view of the motor of FIG. 1.
Figure 3:
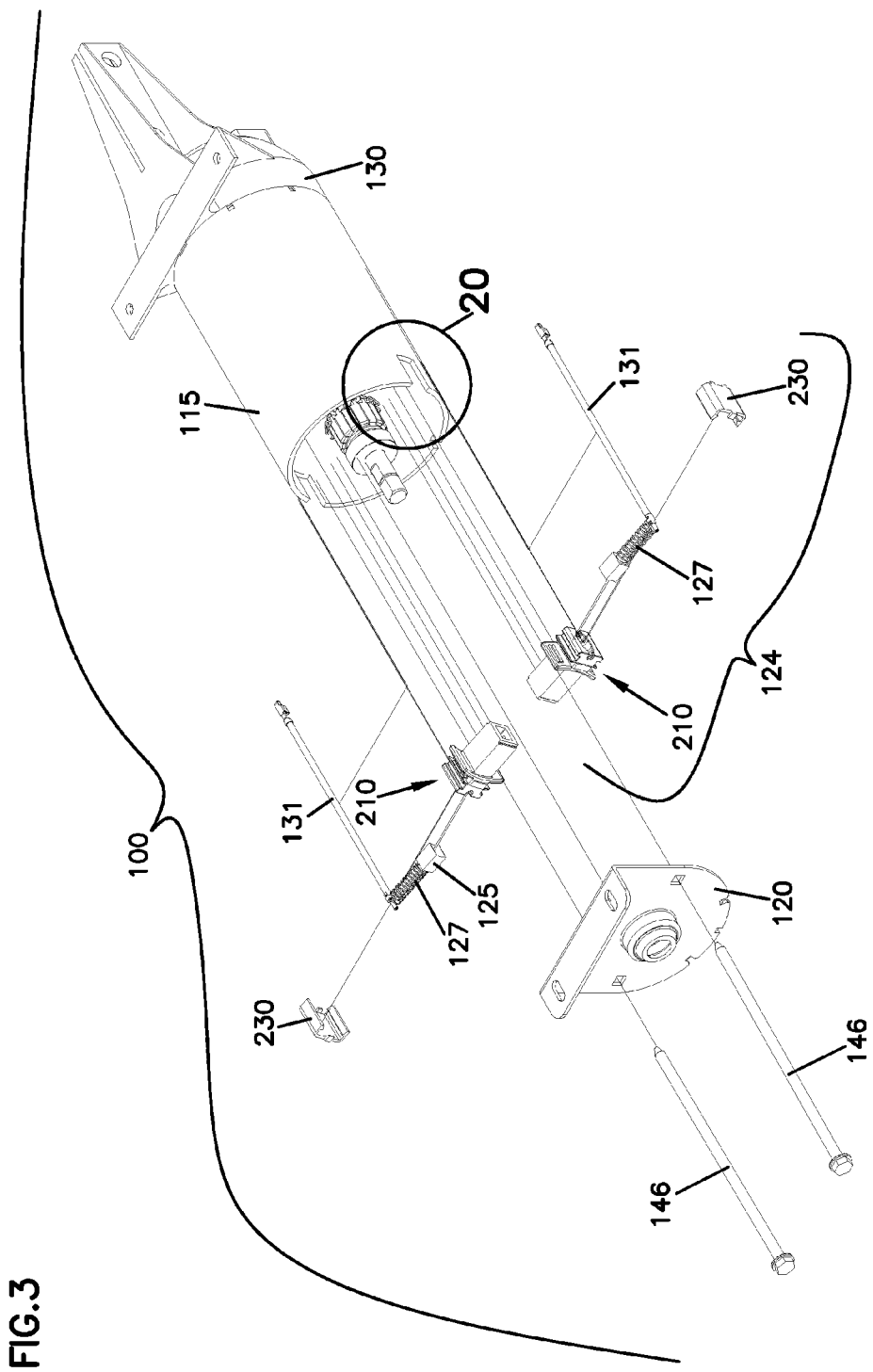
FIG. 3 is a perspective exploded view of the motor of FIG. 1.
Figure 4:
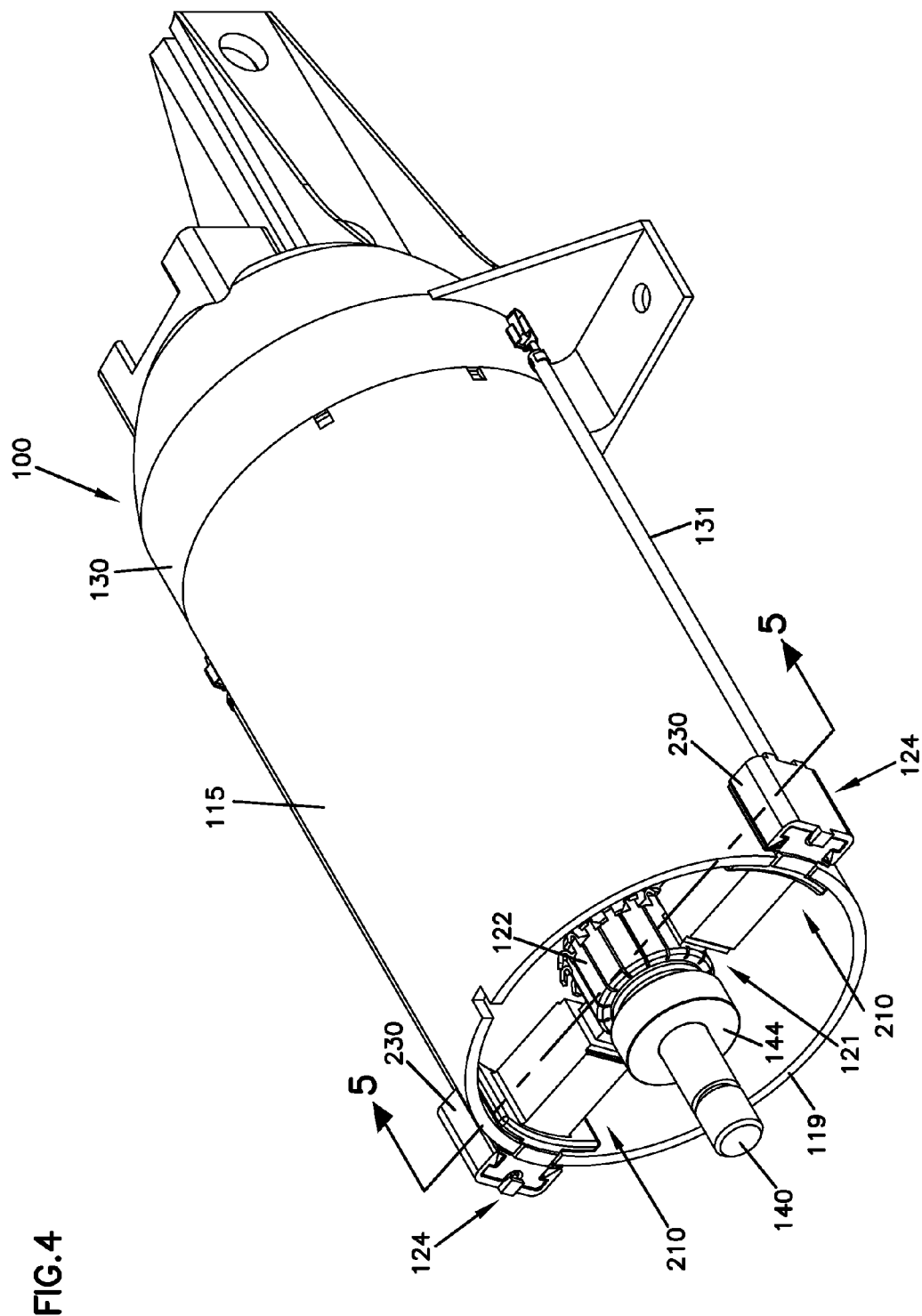
FIG. 4 is a perspective view of the motor of FIG. 1 with an endcap removed.
Figure 5:
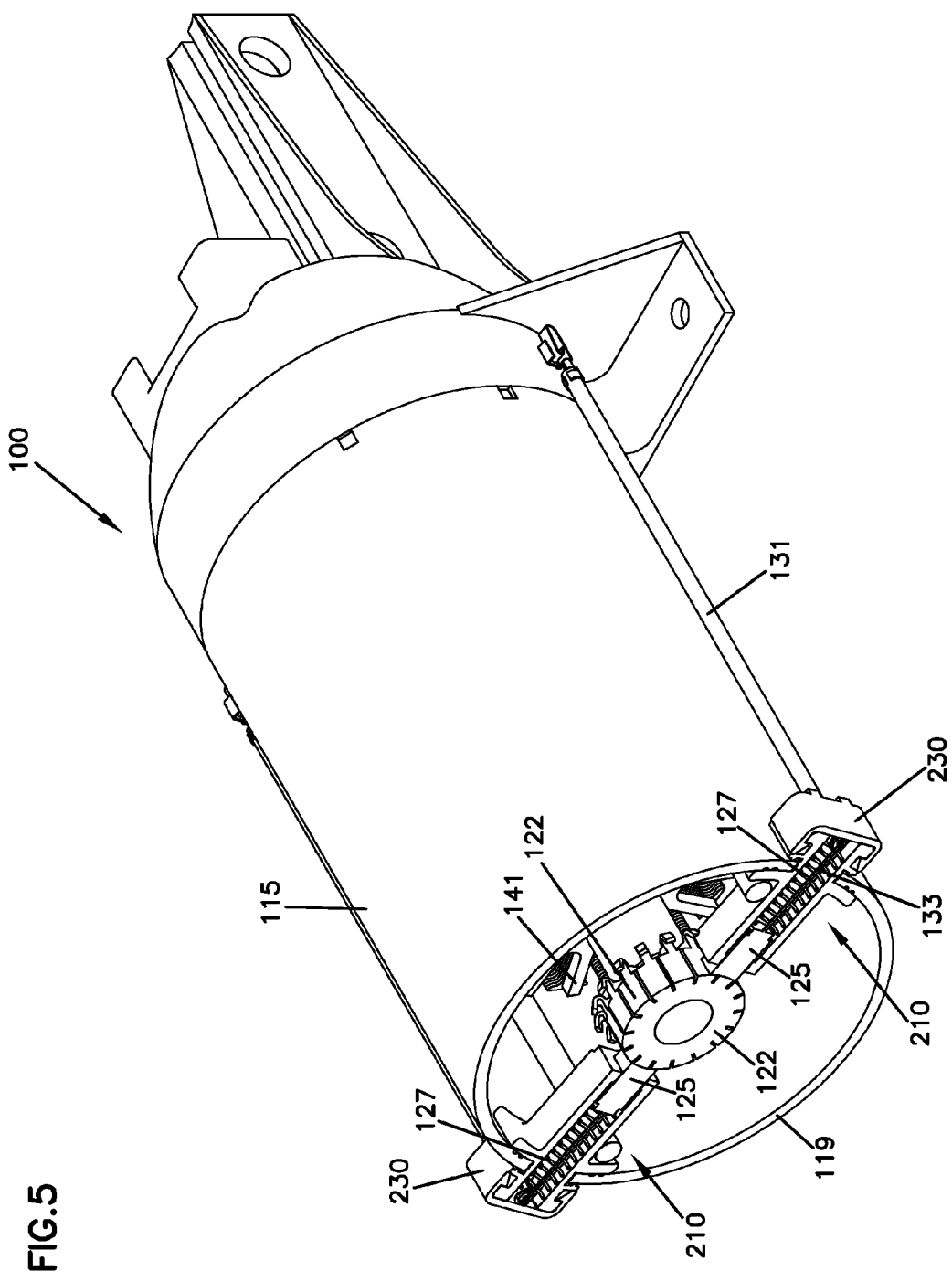
FIG. 5 is a cross-sectional view of the motor of FIG. 4 taken along line 5-5.
Figure 6:
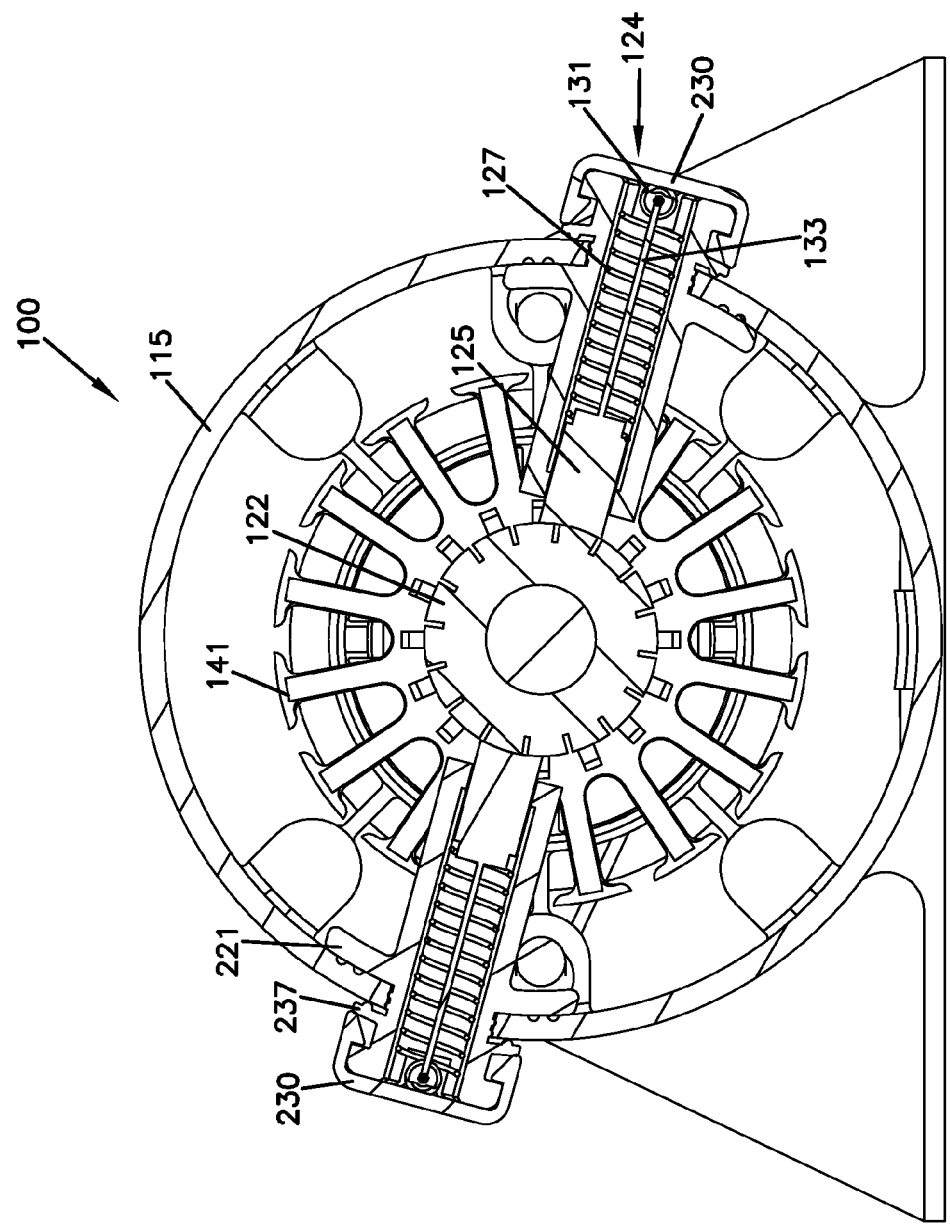
FIG. 6 is a cross-sectional view of the motor of FIG. 2 taken along line 6-6.

Referring now to FIGS. 1-6, an example embodiment of an electric motor 100 is shown. Although example electric motor 100 is a permanent magnet direct current ("DC") motor, other types of motors can be used. Examples of other types of motors include, without limitation, universal motors or other types of brush-commutated motors.

Electric motor 100 generally includes a housing 110 with a cylindrical sleeve 115 and endcaps 120, 130 that enclose a rotational assembly 121 including a commutator 122 and an armature 141. Permanent magnets (not shown) are mounted adjacent to armature 141.

Brush holder assemblies 124 are coupled to sleeve 115 and hold conductive brushes 125. Brush springs 127 are positioned within brush holder assemblies 124 to force brushes 125 into electrical contact with commutator 122. Power wires 131 extend from a terminal end 132 to brush holder assemblies 124. The opposite end of each power wire 131 is connected to a shunt 133 that extends to brush 125. Terminal end 132 of each power wire 131 is connected to a source of electrical current. This electrical current is delivered to commutator 122 through power wires 131, shunts 133, and brushes 125 to commutate motor 100.

A shaft 140 is rotatably disposed within a front bearing 144 and a rear bearing (not shown). Shaft 140 can project from apertures in one or both of endcaps 120, 130. Endcaps 120, 130 are coupled to sleeve 115 using fasteners, such as a nut and bolt fastening system. For example, in one embodiment, bolts 146 extend between endcaps 120, 130 to clamp endcaps 120, 130 together with sleeve 115 to form an integrated unit. Other configurations are possible.

Additional details regarding an example permanent magnet DC motor, such as motor 100, are provided in U.S. Pat. No. 6,417,595 to Wasson, the entirety of which is hereby incorporated by reference.

Figure 7:
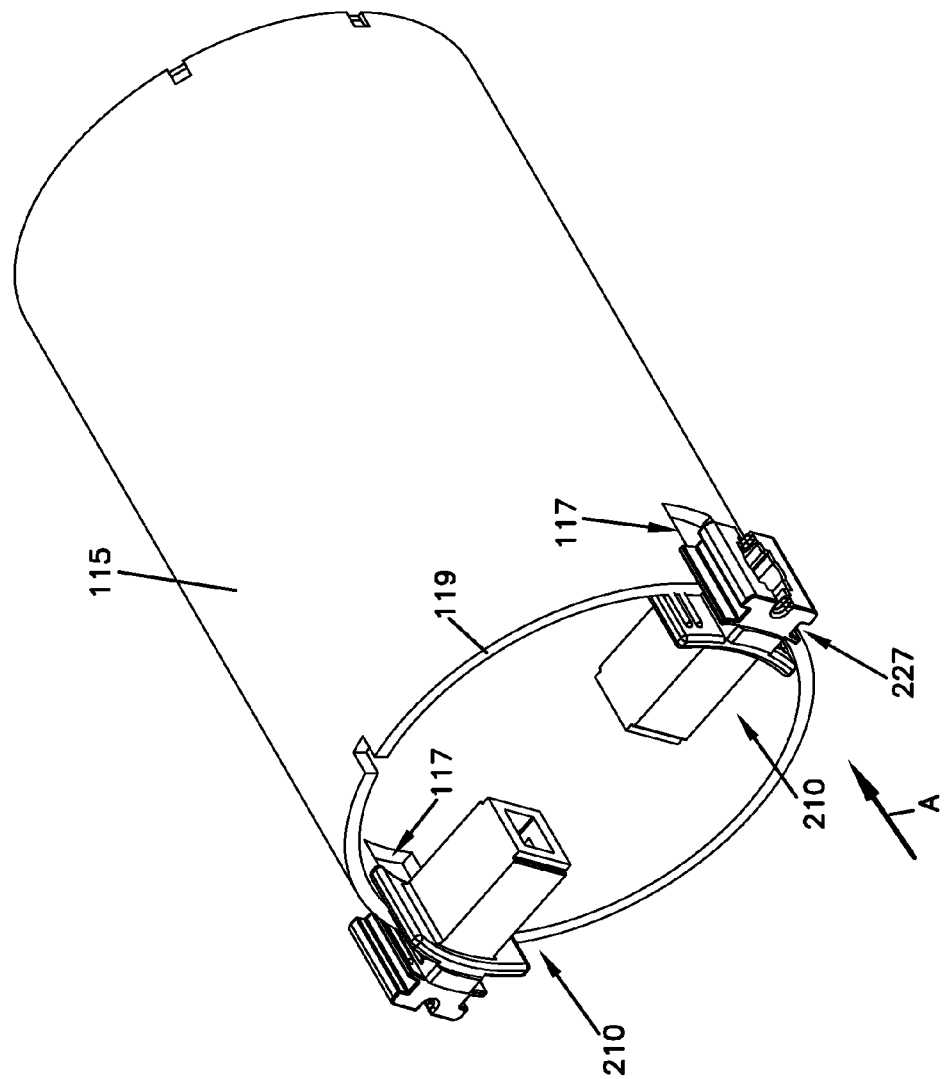
FIG. 7 is a perspective view of two example brush boxes of brush holder assemblies partially inserted into notches formed in an example sleeve of the motor of FIG. 1.

Referring now to FIGS. 3-14, brush holder assemblies 124 each include a brush box 210 and a brush box cover 230. Brush box 210 includes a main body 211 with walls 212, 214, 216, 218 forming a cavity 220 sized to receive brush 125. Brush box 210 also includes a cover portion 213 with projections 231 and a central opening 233 formed in a top of cover portion 213 sized to receive brush 125. Cover portion 213 also includes U-shaped openings 235 (see FIGS. 8, 10, and 14) sized to receive power wires 131, as described further below.

Brush box 210 includes arms 221 extending from main body 211, and arms 237 extending from cover portion 213. Channels 227 are formed between arms 221 and 237. As shown in FIGS. 12 and 13, arms 221 include projections 222, arms 237 include projections 224, and projections 226 are formed on main body 211. Projections 222, 224, 226 are configured to engage sleeve 115 to couple brush box 210 to motor 100, as described further below.

In example embodiments, sleeve 115 is between 0.90 and 0.25 inches in thickness, and a distance X between arms 221 and 237 (see FIG. 10) is between 0.0905 and 0.255 inches. Other dimensions can be used.

Figure 20:
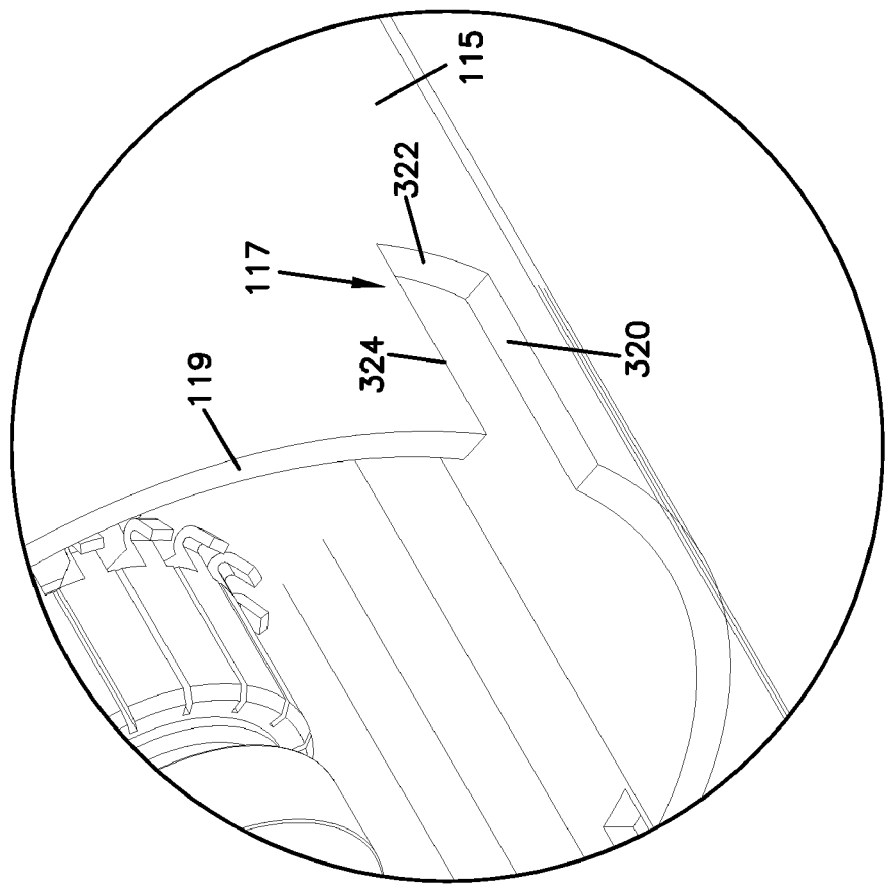
FIG. 20 is an enlarged view of a portion of the sleeve of FIG. 3.

Referring now to FIGS. 3, 6, 7, and 20, sleeve 115 includes notches 117 formed in an end 119 of sleeve 115 to receive brush boxes 210. Each notch 117 includes walls 320, 322, 324 that generally form a C-shaped opening in end 119 of sleeve 115. Brush box 210 can be axially slid in a direction A into notch 117 so that walls 320, 324 are received in channels 227 and arms 221, 237 extend over walls 320, 324. See FIG. 7. In example embodiments, arms 221, 237 are formed with a slight radius (see FIG. 10) to generally follow the contour of cylindrical sleeve 115, and projections 222, 224, 226 are configured to engage or otherwise create an interference fit with walls 320, 324 of sleeve 115. In alternative embodiments, arms 221, 237 can be straight. Brush box 210 can be slid into notch 117 until an end 251 of main body 211 contacts wall 322.

In this position, brush box 210 is axially positioned such that brush box 210 is contained within notch 117 and does not extend beyond end 119 of sleeve 115. Endcap 120 can be coupled to sleeve 115 to enclose or capture brush box 210 within notch 117. In this configuration, brush box 210 and brush 125 located therein are positioned in at least three planes: (i) angularly relative to the permanent magnets within sleeve 115 by walls 320, 324 of notch 117; (ii) radially relative to the surface of commutator 122 by arms 221, 237 that are engaged by walls 320, 324; and (iii) axially relative to sleeve 115 by wall 322 and endcap 120.

In example embodiments, brush box 210 is made of a non-conductive material such as, for example, a polymer. In some embodiments, brush box 210 is made of a thermo set or thermal plastic. Non-conductive materials are used so that brush box 210 can electrically isolate brush 125 contained therein from sleeve 115 of motor 100.

Figure 15:
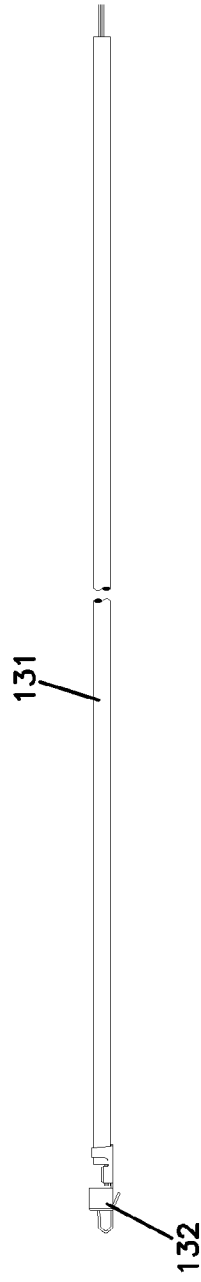
FIG. 15 is a side view of an example power wire for an electric motor.
Figure 16:
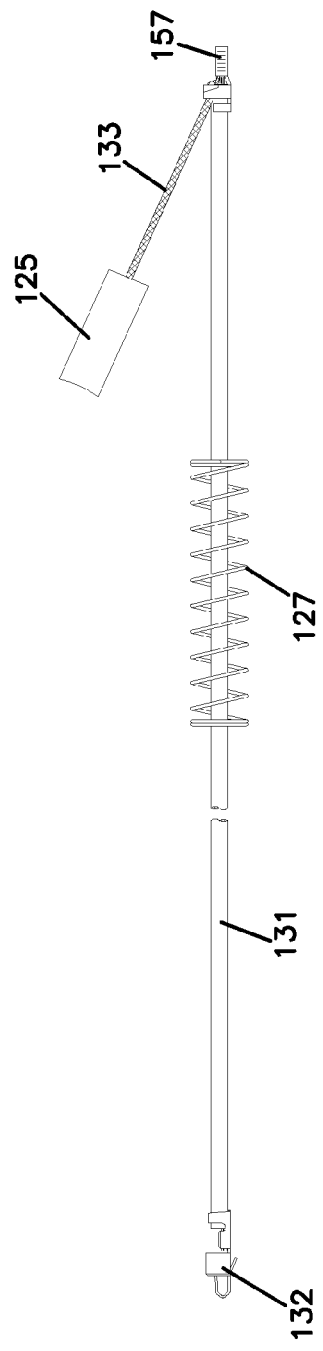
FIG. 16 is a side view of the power wire of FIG. 15, along with an example conductive brush and an example lead.

Referring now to FIGS. 3, 5, 6, 15, and 16, positioned within cavity 220 of brush box 210 are springs 127 and brushes 125. Brushes 125 extend through an opening 239 formed in a bottom of main body 211 of brush box 210 and contact commutator 122. Shunts 133 extend through springs 127 to brushes 125. Power wires 131 extend through openings 235 in cap portion 213 and are electrically connected to shunts 133. For example, each power wire 131 can be connected to a respective shunt 133 by a splice terminal 157. See FIG. 16.

In some embodiments, gas tight connections are formed from the connection of terminal end 132 of power wire 131 through the connection of shunt 133 to brush 125. In other words, positives connections are formed in each junction from terminal end 132 to brush 125 to minimize air gaps within each connection that can be a source of corrosion. These example connections can include: (i) a gas tight connection from the source of electric current to terminal end 132 of power wire 131; (ii) a gas tight connection from power wire 131 to shunt 133 formed by splice terminal 157; and (iii) a gas tight connection from shunt 133 to brush 125. In this manner, reliable electric connections are provided from terminals ends 132 of power wires 131 through to brushes 125.

In other embodiments, other configurations can be used to connect power wire 131 to brush 125. For example, in one embodiment, shunt 133 is replaced by a conductive portion formed in brush box 210 that extends from power wire 131 to brush 125.

Figure 17:
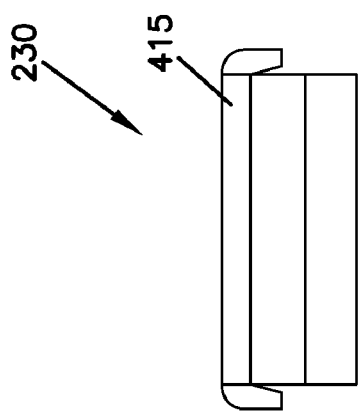
FIG. 17 is a side view of an example brush cover of the brush holder assembly of the motor of FIG. 1.
Figure 18:
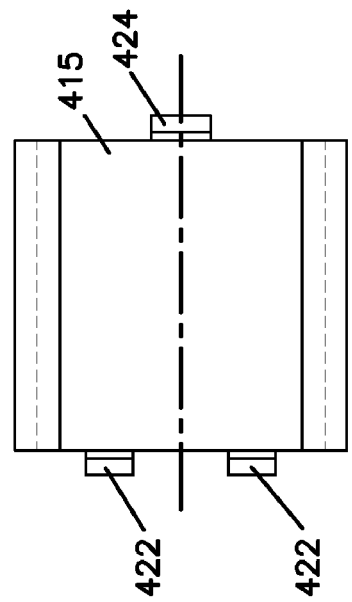
FIG. 18 is a top view of the brush cover of FIG. 17.
Figure 19:
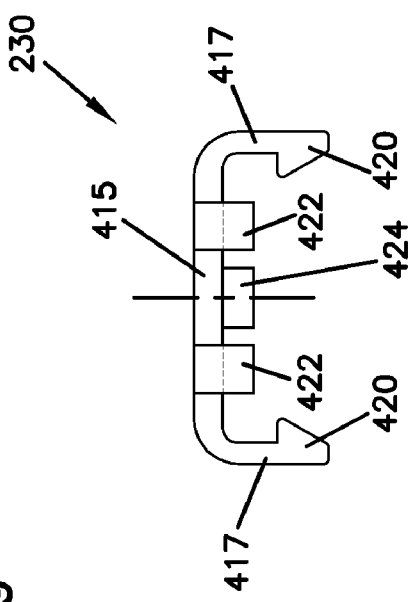
FIG. 19 is an end view of the brush cover of FIG. 17.

Referring now to FIGS. 3-6 and 17-19, brush box cover 230 of brush holder assembly 124 is shown. Cover 230 includes a main body 415 with arms 417 extending therefrom. Arms 417 include barbs 420. Arms 417 are sized to extend about projections 231 of cover portion 213 of brush box 210, and barbs 420 catch projections 231 to couple cover 230 to brush box 210. In example embodiments, cover 230 can be snapped onto or otherwise coupled to cover portion 213 by placing barbs 420 against projections 231 and applying pressure on main body 415 toward cover portion 213 so that arms 417 bow slightly outwardly away from each other to allow barbs 420 to clear projections 231. Once barbs 420 clear projections 231, arms 417 return to their resting positions and barbs 420 engage projections 231 to maintain cover 230 on brush box 210.

In example embodiments, main body 415 of cover 230 also includes a projection 424 that projects downwardly from main body 415 to cover the unused U-shaped opening 235 of brush box 210 that is opposite to that of the U-shaped opening 235 through which power wire 131 extends. Example main body 415 also includes projections 422 positioned on an opposite side of that of projection 424. Projections 422 are spaced to partially surround power wire 131 extending through U-shaped opening 235.

In example embodiments, once in place on cover portion 213, cover 230 provides a surface against which one end of spring 127 is positioned. The opposite end of spring 127 is positioned against brush 125 to force or bias brush 125 against commutator 122. Cover 230 also functions to cover opening 233 of brush box 210 and thereby reduce an amount of dirt and other debris that can enter brush box 210 of brush holder assembly 124. Cover 230 further functions to electrically isolate the brush 125 contained therein.

In some embodiments, brush box 210 can be coupled to sleeve 115 during manufacture of motor 100, and endcap 120 can be used to secure brush box 210, as described above. After the components of motor 100, including commutator 122, are assembled in sleeve 115, brush 125 and spring 127 can be placed through opening 233 and into cavity 220 of brush box 210 with power wire 131 extending therefrom, and cover 230 can be placed on brush box 210 to assembly brush holder assembly 124.

In alternative embodiments, brush 125 and spring 127 can be placed through opening 233 and into cavity 220 of brush box 210 with power wire 131 extending therefrom, and cover 230 can be placed on brush box 210 to assembly brush holder assembly 124. Once brush holder assembly 124 is assembled, brush holder assembly 124 can then be coupled to sleeve 115 of motor 100 as described above.

In some embodiments, cover 230 can be removed and brush 125 replaced after the end of the useful life for brush 125 is reached. For example, cover 230 can be removed by applying outward/upward pressure to one or both of arms 417 to allow arms 417 to bow outwardly away from one another to clear projections 231. Then, when cover 230 is removed, brush 125 and spring 127 can be removed from brush box 210, and a new brush 125 and/or spring 127 can be introduced into brush box 210. Cover 230 can then be replaced.

Examples of the brush holder assemblies disclosed herein can perform various functions. Examples of such functions can include one or more of the following: (i) holding the brushes in place against the commutator; (ii) holding the springs in place against the brushes; (iii) electrically isolating the brushes from the sleeve; (iv) insulating the brushes from the sleeve; (v) meeting thermal requirements; (vi) providing strain relief for the power wires; and (vii) providing access to the brush for repair/replacement.

The above specification, examples and data provide a complete description of the manufacture and use of example embodiments disclosed herein. Since many embodiments can be made without departing from the spirit and scope of the disclosure, the invention resides in the claims hereinafter appended.

What is claimed is:

1. A brush holder assembly for an electrical motor, the brush holder assembly comprising:
    a brush box including a main body and a cover portion, the main body defining a cavity and including a set of first arms extending in opposition from the main body, and the cover portion defining an opening in communication with the cavity and including a set of second arms extending in opposition from the cover portion, and a set of projections extending in opposition to one another from the cover portion, wherein each of the set of first arms and a respective one of the set of second arms define a channel therebetween sized to receive a portion of a sleeve of the electric motor;
    a cover that is coupled to the cover portion of the brush box;
    a brush located in the cavity of the brush box; and
    a spring with first and second ends, the first end being positioned against the cover, and the second end being positioned against the brush to force the brush away from the cover and towards a commutator of the electric motor.

2. The brush holder assembly of claim 1, wherein each of the first arms are formed with a radius to follow a contour of a cylindrical portion of the sleeve of the electric motor.

3. The brush holder assembly of claim 1, wherein the cover includes a main body, first and second cover arms, and a barb located on each of the first and second cover arms, and wherein the cover is snapped onto the cover portion of the brush box by forcing the first and second cover arms to bow outwardly away from one another so that the barbs clear and then engage the projections of the cover portion.

4. The brush holder assembly of claim 1, further comprising a U-shaped opening defined by the cover portion, the U-shaped opening being sized to receive a power wire.

5. The brush holder assembly of claim 4, further comprising a lead electrically connected to the power wire at a first lead end, and electrically connected to the brush at a second lead end.

6. The brush holder assembly of claim 5, wherein the connection between the power wire and the first lead end, and the connection between the brush and the second lead end are both gas tight connections.

7. The brush holder assembly of claim 1, wherein the brush holder assembly is configured to be slid into a notch formed in the sleeve of the electric motor so that the channels of the brush box receive the portions of the sleeve of the electric motor.

8. An electric motor, comprising:
    a cylindrical sleeve including first and second ends, the first end defining a C-shaped notch therein;
    a rotational assembly including a commutator located in the sleeve;
    a brush box including a main body and a cover portion, the main body defining a cavity and including a set of first arms extending in opposition from the main body, the cover portion defining an opening in communication with the cavity and including a set of second arms extending in opposition from the cover portion, and each of the set of first arms and a respective one of the set of second arms define a channel therebetween sized to receive a portion of the sleeve as the brush box is slid axially into the notch formed in the sleeve;
    an endcap coupled to sleeve to capture the brush box in the notch of the sleeve;
    a brush located in the cavity of the brush box; and
    a spring positioned against the brush to force the brush towards the commutator of the electric motor.

9. The motor of claim 8, wherein each of the first arms are formed with a radius to follow a contour of the sleeve of the electric motor.

10. The electric motor of claim 8, further comprising a cover including a main body, first and second cover arms, and a barb located on each of the first and second cover arms, wherein the cover is snapped onto the cover portion of the brush box by forcing the first and second cover arms to bow outwardly away from one another so that the barbs clear and then engage projections on the cover portion.

11. The electric motor of claim 8, further comprising a U-shaped opening defined by the cover portion, the U-shaped opening being sized to receive a power wire.

12. The electric motor of claim 8, further comprising a lead electrically connected to a power wire at a first lead end, and electrically connected to the brush at a second lead end.

13. The electric motor of claim 12, wherein the connection between the power wire and the first lead end, and the connection between the brush and the second lead end are both gas tight connections.

* * * * *